June 24, 1958
P. F. HAYNER
2,839,930
GYROSCOPE
Filed Nov. 12, 1953
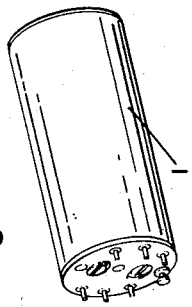
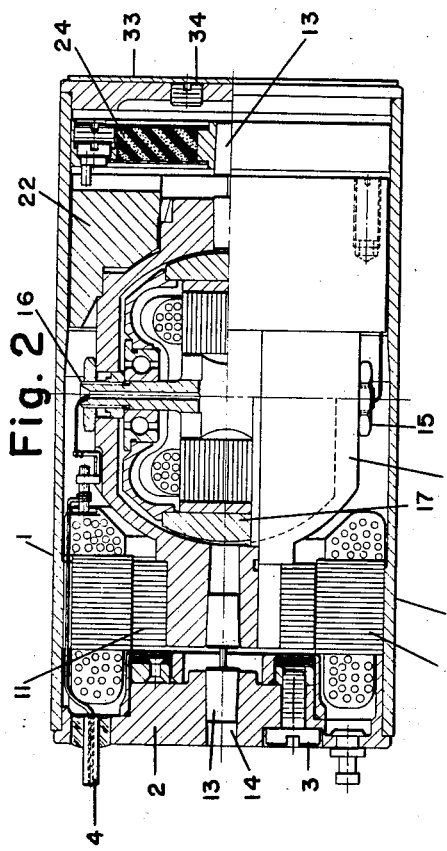
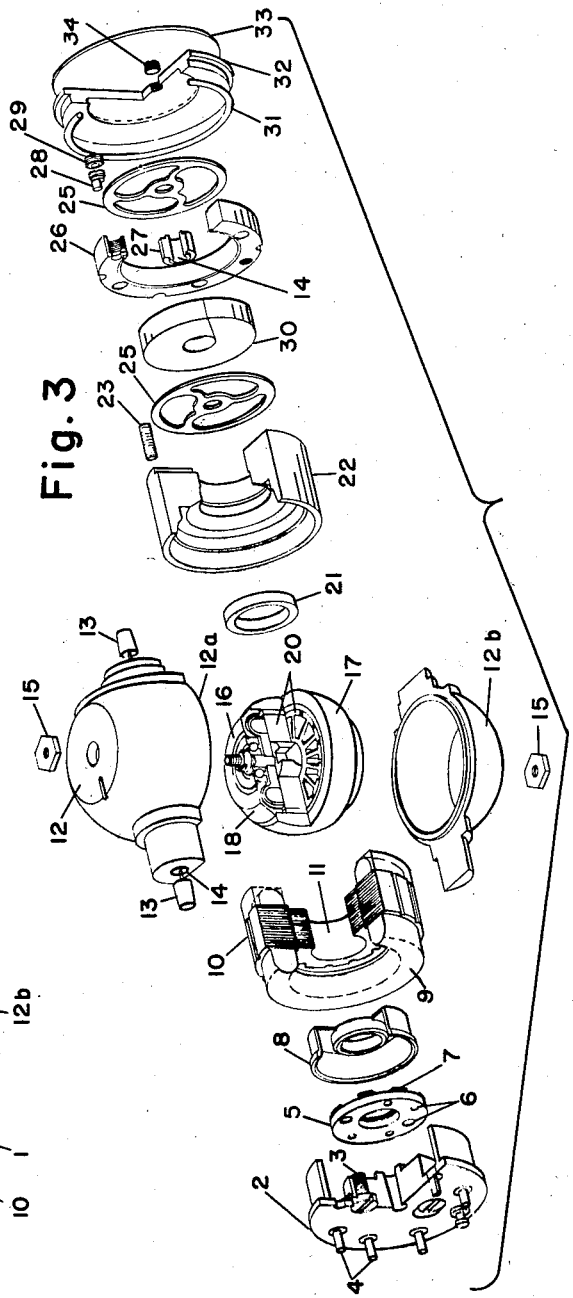
Paul F. Hayner
INVENTOR.
BY
Attorney

United States Patent Office 2,839,930
Patented June 24, 1958

2,839,930

GYROSCOPE

Paul F. Hayner, Pelham, N. H., assignor, by mesne assignments, to Sanders Associates, Incorporated, Nashua, N. H., a corporation of Delaware Application November 12, 1953, Serial No. 391,479

7 Claims. (Cl. 74—5)

This invention relates generally to gyroscopes and, more particularly rate gyros, of the type employed in modern aircraft, guided missiles and the like. It is particularly directed to the provision of a gyroscope which is of exceedingly small size while, at the same time, having an improved performance relative to similar instruments of larger size.

In reducing the size of the gyroscope while improving its performance, consideration must be given to various factors including the gyro gimbal construction, its mounting system and the pick-off method. Moreover, in all gyroscopes of this type, it is highly desirable if not essential that their gimbals be exceedingly rigid and strong in construction while of relatively light weight.

It is, therefore, a fundamental object of the present invention to provide an improved gyro of as small size as is possible while, not sacrificing but rather improving the performance of the instrument itself.

More specifically, it is an object of the invention to provide an improved gimbal and associated parts for a gyro of the type described.

A further object is to provide an improved gyro gimbal having great rigidity and strength, while of relatively light weight.

Other and further objects will become apparent from the following description:

The construction of the gyro gimbal providing strength and rigidity is an extremely important consideration in the design of modern gyroscopes. In accordance with the present invention, adequate strength and rigidity and an improved gimbal and rotor support are provided by the employment of a gimbal comprising a pair of hollow spherical sections which are held in juxtaposition and provide a spherical housing for the gyro rotor and associated parts. The rotor is pivotally supported by bearings carried one on each of the two gimbal sections so as to establish the rotor's axis of spin. On one of the sections in a plane perpendicular to the axis of spin, mountings are formed, preferably integrally with the gimbal section, for pivotally engaging an outer gimbal suspension. There is thus provided a structure of exceedingly great strength and rigidity while of relatively light weight and with a very small increase in size and inertia about the output axis. The arrangement also minimizes the effect on the gyro's operation of resonant frequencies and other distortions at the supporting points of the gyro.

In accordance with this and other features of an invention which are included in copending applications and are shown but not claimed in this application, all moving bearings are eliminated from the gyro gimbal suspension and the support and the centering of the gimbal are accomplished by torsion bars of special design. These bars not only provide the required supporting means, but also a restraining torque which resists the motion of the gimbal about the output axis. Friction is essentially completely eliminated from the output shaft suspension.

In the construction herein described embodying the various features of the present invention, as well as other contemporary inventions, there is achieved a subminiature gyro, less than one inch in diameter, less than two inches long and weighing only 2.9 ounces. This constitutes the smallest gyro now known to exist and meets or exceeds the performance characteristics of larger rate gyros, yet is capable of low cost production.

For a more detailed description of the present invention, reference may now be made to the following description taken in connection with the accompanying drawing.

In the drawing, Fig. 1 is a perspective side view of a gyroscope embodying the present invention shown in actual size; Fig. 2 is an enlarged, side elevation view, partly in section, of the gyroscope of the present invention; and Fig. 3 is an exploded, perspective view, partly in section, of the gyro shown in Figs. 1 and 2.

Referring now to the drawing, and particularly to Figs. 2 and 3, the gyro of the present invention is shown comprising a casing or housing 1 of generally cylindrical form having attached at one end, a cap 2 which may be mounted in a suitable place.

Provided in the end cap 2 are adjusting screws 3 and leads 4. An adjusting ring 5 is provided adjacent to the end cap 2 with rivet holes 6 and pick-off adjustment elements 7, as shown. An adjusting sealer 8 is disposed at the opposite side of ring 5, followed by the pick-off windings 9, in which there is disposed a pick-off stator 10 and rotor 11, as shown.

The gimbal 12 is disposed, in a central position in the housing, as shown in Fig. 2, and comprises the split upper and lower sections 12a and 12b whcih are shown in detail in Fig. 3.

Torsion bars 13 are provided at opposite ends of the gimbal. These bars are of an integral, elastic metal construction, in this embodiment, beryllium copper. They comprise a narrow central portion which provides the spring restraint, that is, it is capable of an axial twisting movement. Enlarged end portions are integrally formed as a part of the torsion bars for effecting a rigid, secure and strong support.

Also, for this purpose the enlarged end portions are tapered and the supports in the gimbal, the end cap 2, and the hub or mount 27, of the S-spring assembly, presently to be described, are correspondingly tapered. There is thereby provided rigid and secure supports which permit the rotative movement of the gimbal about the output axis, caused by the angular velocity of the rotor. The torsion bars also provide a restraining torque which resists this angular movement about the output axis and returns the gimbal and rotor to their normal relative angular positions immediately after the input force of the gyro has been removed. Friction is thus essentially eliminated from the output axis of the gyro. By virtue of these torsion bars no moving bearings are required for the gimbal suspension and both support and centering of the gimbal are accomplished.

The nuts 15 at the top and bottom of the gimbal sections secure the shaft 16 to the rotor 17. The gyro rotor 17 is preferably constructed of a high density material such as tantalum. Suitable retainers and bearings are provided at each end of the rotor shaft. This arrangement provides a symmetrical, balanced, non-cantilever type of rotor support. Caps 18 are provided for the rotor at each end thereof. The two sections of the gimbal are retained by the ring 21 and pick-off rotor 11, as shown. A cement may be applied between their contacting edges insuring that they are air and liquid tight. An annular temperature compensator member 22, in which several balance screws 23 may be secured, one being shown in Fig. 3, is disposed at this end of the housing.

The damping member 22 is constructed of a suitable material, such as nylon, which expands with increasing temperature, reducing the gap between it and the housing.

For the purpose of preventing special strain on the torsion bars by different rates of expansion of the parts within the gyro, with temperature changes, there is provided an S-spring assembly 24, at one end of the housing. This assembly comprises a pair of S springs 25 disposed on opposite sides of a ring member 26. A hub element 27, has the tapered torsion bar mounting 14, as previously described, and the output axis stop pin 28 and lock 29 are provided as indicated. Within the S-spring assembly 24 an annular pressure compensator 30 is disposed. An O-ring or gasket 31, a housing cap 32, and name plate 33 are secured, in the order named, at this S-spring end of the housing.

The special S-spring assembly, above described, permits the movable parts of the assembly to be relatively free for longitudinal movement with respect to the housing, while remaining rigidly fixed for transverse forces. Among its other advantages, this arrangement, as above pointed out, compensates for strains caused by different rates of expansion of the parts within the gyro relative to the housing.

The housing 1 is completely filled with a suitable fluid, such as oil, through the plug 34 in housing cap 32. Under temperature cycling, different rates of expansion of the fluid and the housing are occasioned. The differences in expansion are compensated for by the provision of the annular member 30 which is disposed within the S-spring assembly and forms a part of the invention of a copending patent application. This member 30 is of a cellular material containing a gas which is easily compressible and thus compensates for any relative change in volume occasioned by the difference between expansion of fluid with increased temperature and the expansion of the housing with such change. Without such compensation leakage or failure of the gyro would result.

In order to maintain the stability of the instrument, the fluid in the housing provides a damping of the movement of the gimbal about the output axis. Also, the gimbal being immersed in the fluid is given a partially buoyant support, which has the effect of reducing its sensitivity to linear acceleration and shock.

It will be seen that the pick-off here provided is basically a differential transformer. The mutual inductance between the primary and secondary of this transformer is varied with their relative angular positions. This in turn is effected by the rotation of the gyro about the output axis. Thus, this movement is translated into an A. C. signal which is proportional to and phase sensitive or directionally responsive to input angular velocity. The arrangement described has a particular advantage in that it is insensitive to small side displacements of the rotor from its center axis. Thus, an increased reluctance of those magnetic circuits on one side, occasioned by the enlargement of the air gap under deflection, is balanced in its effect on mutual inductance by the reduced reluctance of the paths on the opposite side.

While there has been shown and described a particular embodiment of the present invention, it will be apparent to those skilled in the art that various changes and modifications may be made without departing from the spirit of the invention, and it is therefore intended in the appended claims to cover all such changes and modifications as fall fairly within the spirit and scope of this invention.

What is claimed is:

1. A gimbal for a gyroscope rotor comprising a pair of hollow spherical sections held in juxtaposition and providing a spherical housing for said rotor; means for pivotally supporting said rotor carried by each of said gimbal sections establishing the axis of spin for said rotor; trunnions carried by one of said gimbal sections on a diameter perpendicular to said axis of spin; and outwardly tapered holes in said trunnions coaxial with said diameter for pivotally engaging a suspension for said gimbal.

2. A gimbal for a gyroscope rotor comprising a hollow metallic sphere formed in two sections, separated along a plane offset from the center of the sphere; rotor supporting means having opposite ends supported, one by each of said gimbal sections and establishing the axis of spin for said rotor perpendicular to said plane; trunnions carried by the larger of said gimbal sections along a diameter parallel to said plane; and outwardly tapered holes in said trunnions coaxial with said diameter for pivotally engaging a suspension for said gimbal.

3. A gimbal for a gyroscope rotor comprising a pair of metallic spherical sections held in juxtaposition and providing a rigid spherical housing for said rotor; means for pivotally supporting said rotor including an axial member having its opposite ends supported, one by each of said gimbal sections and establishing the axis of spin for said rotor; elongated trunnions integrally formed at the opposite sides of one of said gimbal sections along a diameter perpendicular to said axis of spin; and outwardly tapered holes in said trunnions coaxial with said diameter for pivotally engaging a suspension for said gimbal.

4. A gyroscope comprising a rotor, a stator, a pair of hollow sections held in juxtaposition and providing a spherical gimbal housing for said rotor and stator; axial means for supporting said rotor and stator and establishing an axis of spin for said rotor, said axial means having its opposite ends supported, one by each of said gimbal sections; trunnions carried on the outside of one of said gimbal sections along a diameter perpendicular to said axis of spin, said trunnions having outwardly tapered holes coaxial with said diameter; a suspension for said gimbal; pivotal members carried by said suspension and rigidly engaging said trunnions; and pick-off means having cooperating parts carried by said suspension and one of said trunnions.

5. A gyroscope comprising a rotor, a stator, a hollow metallic sphere formed in two sections separated along a plane offset from the center of the sphere and providing a rigid gimbal housing said rotor and stator; means for supporting said rotor within said gimbal having its opposite ends supported, one by each of said gimbal sections and establishing the axis of spin for said rotor perpendicular to said plane; trunnions integrally formed on the outside of one of said gimbal sections in an axis parallel to said plane, said trunnions having outwardly tapered holes coaxial with the axis of said trunnions; a suspension for said gimbal; and pivotal members carried by said suspension and rigidly mounted in said integral trunnions.

6. A gyroscope comprising a rotor, a stator, a pair of hollow sections held in juxtaposition and providing an enclosed, gas tight, spherical gimbal housing said rotor and stator and of light metallic construction but of exceeding rigidity and strength; means for supporting said rotor and stator in said gimbal having opposite ends supported one by each of said gimbal sections and establishing the axis of spin for said rotor; trunnions carried by one of said gimbal sections along a diameter perpendicular to said axis of spin, said trunnions having outwardly tapered holes coaxial with said diameter; a suspension for said gimbal; and pivotal members carried by said suspension and engaging said trunnions.

7. A gimbal for a gyroscope rotor comprising: a pair of hollow, spherical sections held in juxtaposition and providing a spherical housing for said rotor; means carried by each of said gimbal sections for spherically supporting said rotor and for establishing the axis of spin for said rotor; and trunnions carried by one of said gimbal sections on a diameter perpendicular to said axis of spin, at least one of said trunnions having an outwardly tapered hole coaxial with said diameter for rigidly engaging a pivotal suspension for said gimbal.

References Cited in the file of this patent
UNITED STATES PATENTS

| | | |
|---|---|---|
| 1,573,028 | Bates | Feb. 16, 1926 |
| 2,301,700 | Heintz | Nov. 10, 1942 |
| 2,409,178 | Allison et al. | Oct. 15, 1946 |
| 2,641,132 | Barkalow | June 9, 1953 |